Oct. 17, 1939.　　　A. G. JUILFS ET AL　　　2,176,629
ADJUSTER
Filed April 21, 1939
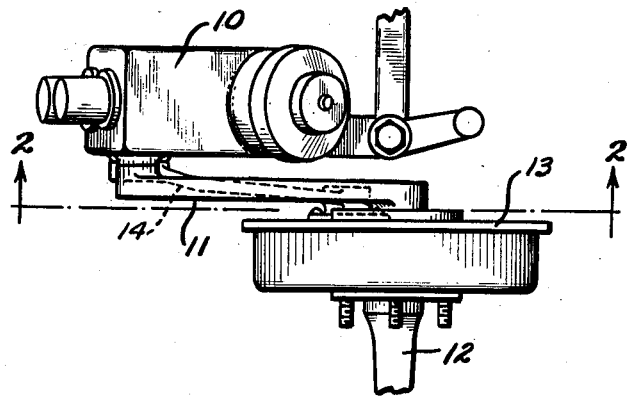
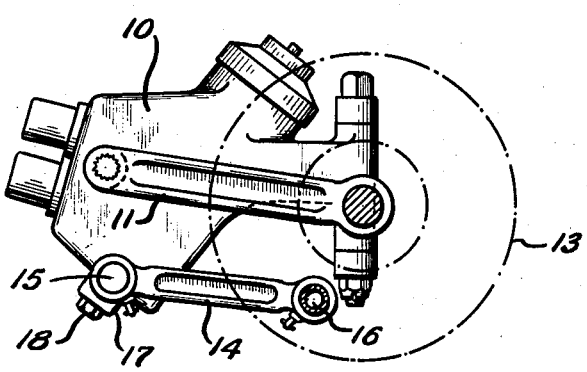
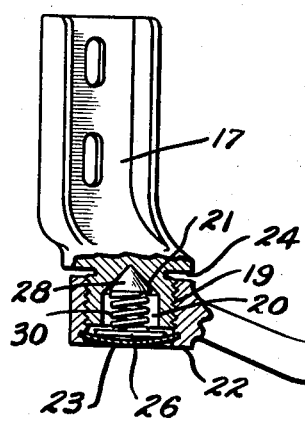
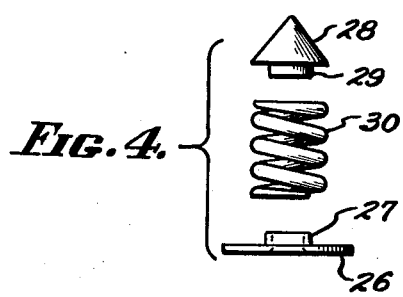
INVENTORS,
ALBERT G. JUILFS
AND OTTO H. JUILFS.
BY
Allen & Allen
ATTORNEYS.

Patented Oct. 17, 1939

2,176,629

UNITED STATES PATENT OFFICE 2,176,629

ADJUSTER

Albert G. Juilfs, Newtown, and Otto H. Juilfs, Cincinnati, Ohio, assignors to Springtramp Eliminator Co., Newtown, Ohio, a partnership Application April 21, 1939, Serial No. 269,190

5 Claims. (Cl. 267—66)

This invention relates to adjusters, and more particularly to an adjuster for taking up clearance due to wear which occurs where two elements are threaded together and are designed to have rotating or oscillatory movement with respect to each other. Specifically our invention is directed toward the problem encountered in connection with the so-called radius arms which extend between a knee action unit and a brake flange in a modern automobile.

In an automobile wheel mounting the brake flange is carried on a bushing on the wheel spindle and is rotatable with respect to the wheel, and means are provided for holding the brake flange against rotation with the wheel and also for holding the brake flange in alignment in a plane parallel to the plane of the wheel so as to eliminate chattering and the like. In connection with the knee action provision must be made for oscillatory movement of the radius arm with respect to both the knee action and the brake flange and this is generally accomplished by means of threaded portions at each end of the radius arm, which threaded portions may turn with respect to each other.

As these parts become worn after several months of use, a clearance is created between the threads, and the radius arm will no longer hold the brake flange firmly in a vertical plane. Then the radius arm and the flange will rattle, and the result may be that when the brake is applied, chattering ensues.

With the above difficulties in mind it is an object of our invention to provide an adjuster which may be applied to the radius arm of an existing automobile which will effectively take up the clearance in the threads and eliminate the undesirable results above discussed. It is a further object of our invention to provide a device as above outlined which will be extremely simple and inexpensive in construction and which can easily be applied to an existing radius arm. It is a further object of our invention to provide a device as described at each point where relative motion between the threaded portions takes place, i. e., at each end of each radius arm.

These and other objects of our invention which will be described more in detail hereinafter or which will be apparent to one skilled in the art upon reading these specifications, we accomplish by that certain construction and arrangement of parts of which we shall now describe an exemplary embodiment. Reference is now made to the drawing forming a part hereof and in which:

Figure 1 is a plan view showing the relation between a wheel and a knee action unit of a present day automobile. In the figure the left front wheel is shown, the front of the assembly being toward the left.

Figure 2 is a partial sectional view taken on the line 2—2 of Figure 1, the outline of the brake flange being shown in dotted lines.

Figure 3 is a detail plan view partially in section of the radius arm showing the adjusters in place.

Figure 4 is a detailed exploded view of an adjuster assembly.

Since the knee action and wheel mounting in general form no part of our invention, these will be described only with sufficient detail to give the setting for our invention. Referring to Figure 1, we have shown at 10 a conventional knee action unit and at 11 the knee action arm which engages the wheel spindle 12. The brake flange is shown at 13 and it has, as described above, oscillating movement about the spindle as by being mounted upon a bushing or the like.

Referring to Figure 2, we have shown the conventional radius arm 14 which is connected to the knee action unit as at 15 and to the brake flange as at 16 and which prevents the brake flange from turning with the wheel. Since the knee action unit 10 permits the wheel and the brake flange to rock upwardly and downwardly, it will be clear that the connections at 15 and 16 must be pivoted.

Referring to Figure 3, the conventional manner of accomplishing the pivotal movement is clearly shown. The radius arm is attached to the knee action unit 10 by means of a bracket 17 which is bolted thereto as at 18. The bracket 17 carries a threaded end 19 which is centrally bored with a hole 20 having a tapered end 21. Threaded upon the portion 19 is the radius arm 14 which has the enlarged end 22 which is internally threaded. A welch plug 23 closes the opening in the portion 22 and prevents degress of grease or other lubricating material. A lubricating hole is provided which is not shown in the drawing but which would be approximately central of the portion 22 as viewed in Figure 3. The grease should travel along the threads until it emerges in the region indicated at 24. It will, of course, be understood that if wear has taken place, the lubricating material may pass substantially straight out without thoroughly lubricating the threads.

In Figure 3 the brake flange is indicated in broken lines at 13 and carries bolted to it the member 25 which is threaded and bored in the same manner as the member 19. The other end of the radius arm 14 is identical with that described at 22 and the parts are assembled and lubricated in the same manner.

The description thus far has related to a construction in use today on a standard automobile. It will be seen that as the threads wear, the radius arm 14 will be permitted to wobble and will not longer hold the brake flange in proper alignment. Briefly, in the practice of our invention we provide means for urging the parts 22 and 19 away from each other so as to take up continuously any clearance due to wear.

In Figure 4 we have shown the adjuster according to our invention. It consists of a base plate 26 carrying a hollow stud 27. A hardened steel tip element 28 has a conical sharply pointed face and carries a stud 29. The studs 27 and 29 are engaged in a relatively heavy compression spring 30.

In assembly, as shown in Figure 3, the base plate 26 bears frictionally against the welch plug 23 and oscillates with the welch plug. The spring 30 urges the steel tip 28 against the conical end of the bore 20. By virtue of the hardened conical tip 28 there is a minimum of friction between the parts 28 and 21. It will also be noted that the taper of the portion 28 is more acute than that of the bore 21 so that contact takes place substantially only at the point. Thus it will be seen that the portion 19 is thrust upwardly in Figure 3 and the portion 22 is thrust downwardly so that the threads of the two elements are brought into solid engagement and held against shimmying. Under these circumstances proper lubrication will take place even when the threads are considerably worn and the objections discussed above are eliminated.

It will be understood that numerous modifications may be made without departing from the spirit of our invention, and that adjusters such as are here described will have utility in installations other than the radius arm of a knee action. We therefore do not intend to limit ourselves except as pointed out in the claims which follow. Having now fully described our invention, what we claim as new and desire to secure by Letters Patent is:

1. In combination with an externally threaded member having a bore terminating in a taper and an internally threaded member threaded onto said externally threaded member, and the open end of said internally threaded member being closed with a welch plug; an adjuster comprising a base plate and a conical tip, the taper of said tip with respect to the taper of said bore being such that there is substantially only point contact between them, and a compression spring between said base plate and tip, said base plate being urged against said welch plug to take up clearance between said threads due to wear.

2. In combination with a knee action radius arm having threaded engagement with hollow studs respectively on a part of the knee action unit and on the brake flange of an automobile, the openings in said radius arm being closed by means of welch plugs, and said threaded studs being hollow; an adjuster comprising a base element bearing against a welch plug and a tip bearing against the inside of a stud, and a compression spring tending to urge said tip and base element apart.

3. In combination with a knee action radius arm having threaded engagement with hollow studs respectively on a part of the knee action unit and on the brake flange of an automobile, the openings in said radius arm being closed by means of welch plugs, and said threaded studs being hollow, said hollow terminating in a taper; an adjuster comprising an element bearing against a welch plug and a tip bearing against the inside of a stud, and a compression spring tending to urge said tip and element apart, said tip being conical and having a taper which is sharper than that of said hollow whereby there is substantially only point contact between said tip and said hollow.

4. In combination with a knee action radius arm having a threaded, bottomed opening for engagement with an externally threaded hollow stud, said stud being formed with a conventionally drilled, tapered bottom hole, an adjuster comprising a conical tip having a cross sectional angle less than that of said tapered bottom, and bearing against said bottom, and a compression spring disposed between said tip and the bottom of said opening.

5. In combination with a knee action radius arm having a threaded, bottomed opening for engagement with an externally threaded hollow stud, said stud being formed with a conventionally drilled, tapered bottom hole, an adjuster comprising a conical tip having a cross sectional angle less than that of said tapered bottom, and bearing against said bottom, and a compression spring disposed between said tip and the bottom of said opening, said conical tip having a spring retaining element axially of the base thereof.

ALBERT G. JUILFS.
OTTO H. JUILFS.